(12) United States Patent
Nishio

(10) Patent No.: US 8,542,372 B2
(45) Date of Patent: Sep. 24, 2013

(54) PROCESSING APPARATUS

(75) Inventor: Yukihito Nishio, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 557 days.

(21) Appl. No.: 12/925,196

(22) Filed: Oct. 15, 2010

(65) Prior Publication Data

US 2011/0090524 A1    Apr. 21, 2011

(30) Foreign Application Priority Data

Oct. 16, 2009    (JP) ................................. 2009-239052

(51) Int. Cl.
G06F 3/12 (2006.01)
G06F 1/00 (2006.01)
G06F 1/26 (2006.01)
G06F 1/32 (2006.01)
G06K 15/00 (2006.01)

(52) U.S. Cl.
USPC ........ 358/1.13; 358/1.14; 358/1.15; 713/300; 713/320; 713/323; 399/81; 399/88

(58) Field of Classification Search
None
See application file for complete search history.

(56) References Cited

U.S. PATENT DOCUMENTS

| | | | |
|---|---|---|---|
| 2004/0139385 A1* | 7/2004 | Sakaue | 715/500 |
| 2005/0088678 A1* | 4/2005 | Namura | 358/1.13 |
| 2006/0075150 A1* | 4/2006 | Hwang et al. | 710/14 |
| 2007/0058190 A1* | 3/2007 | Harumichi | 358/1.13 |
| 2007/0183107 A1* | 8/2007 | Okada | 361/62 |
| 2007/0279669 A1* | 12/2007 | Kanamori | 358/1.14 |
| 2008/0266588 A1* | 10/2008 | Inaba | 358/1.13 |
| 2009/0235098 A1* | 9/2009 | Matsunaga | 713/320 |
| 2010/0020344 A1* | 1/2010 | Ohtani | 358/1.13 |
| 2010/0220346 A1* | 9/2010 | Hakamada | 358/1.13 |
| 2010/0235775 A1* | 9/2010 | Sugimoto | 715/772 |

FOREIGN PATENT DOCUMENTS

| | | | |
|---|---|---|---|
| JP | 2001-148751 | * | 5/2001 |
| JP | 2006-231532 | A | 9/2006 |
| JP | 2007-048219 | A | 2/2007 |
| JP | 2007-142634 | A | 6/2007 |
| JP | 2007-230054 | A | 9/2007 |
| JP | 2008-160413 | A | 7/2008 |

* cited by examiner

*Primary Examiner* — King Poon
*Assistant Examiner* — Vincent Peren
(74) *Attorney, Agent, or Firm* — Edwards Wildman Palmer LLP; David G. Conlin; David A. Tucker

(57) ABSTRACT

A multifunctional apparatus comprises a main power board, electricity feed switching section, operating panel and control section. The main power board supplies electric power to a plurality of processing units. The electricity feed switching section allows a user to switch electricity feed status between the main power board and the respective processing units separately. The operating panel displays an icon depicting the apparatus and electricity feed status of the processing units of the apparatus. The control section controls the electricity feed switching section so as to switch electricity feed status to the processing unit of which icon a user touches, and causes to display on the operation panel modes of operation associated with the processing unit. The control section controls the electricity feed switching section so as to switch the electricity feed status to one or more processing units associated with the mode of operation that a user has selected.

7 Claims, 17 Drawing Sheets

FIG.4

| PROCESSING UNIT | READY MODE | SLEEP MODE | PRINTER MODE | FAX MODE | SCAN PC MODE | SCAN HDD MODE | SCAN USB MODE | USB PRINT MODE | COPY MODE |
|---|---|---|---|---|---|---|---|---|---|
| DOCUMENT READING SECTION | ○ | | | ○ | ○ | ○ | ○ | | ○ |
| USB DEVICE CONNECTION SECTION | ○ | ○ | | | | | ○ | ○ | |
| IMAGE FORMING SECTION | ○ | | ○ | | | | | ○ | ○ |
| USB HOST CONNECTION SECTION | ○ | ○ | | | | | ○ | ○ | |
| FAX COMMUNICATION SECTION | ○ | ○ | | ○ | | | | | |
| LAN CONNECTION SECTION | ○ | | ○ | | ○ | | | | |
| MEMORY SECTION | ○ | | | ○ | ○ | ○ | ○ | ○ | ○ |

POWER SOURCE TO PRINTER IS TURNED ON.
RELATED MODES ARE AS BELOW.
WHICH MODE IS BEING USED?
SELECT.

PRINTER MODE

USB PRINT MODE

COPY MODE

POWER SOURCE TO SCANNER IS TURNED ON.
RELATED MODES ARE AS BELOW.
WHICH MODE IS BEING USED ?
SELECT.

| FAX TRANSMITTING MODE |
| SCAN PC MODE |
| SCAN HDD MODE |
| SCAN USB MODE |
| COPY MODE |

POWER SOURCE TO SCANNER AND PRINTER IS TURNED ON.
RELATED MODES ARE AS BELOW.
WHICH MODE IS BEING USED?
SELECT.

COPY MODE

PROCESSING APPARATUS

CROSS REFERENCE

This Nonprovisional application claims priority under 35 U.S.C. §119(a) on Patent Application No. 2009-239052 filed in Japan on Oct. 16, 2009, the entire contents of which are hereby incorporated by reference.

BACKGROUND OF THE INVENTION

The present invention relates to a processing apparatus comprising a plurality of units for carrying out a variety of processes.

A processing apparatus such as multifunctional printer that has functions of a copier, printer, scanner, facsimile and the like is configured of numbers of units; if electricity to all these units is always turned on, then electric power is also consumed by the units that are in stand-by status, which results in an increased electric power consumption. For this reason, among the conventional processing apparatus, there have been ones in which the electric power consumption is reduced by causing each unit to undergo a transition to a sleep mode and thereby halting the feed of electricity to each unit from a main power supply unit when stand-by time thereof amounts to a predetermined time.

Also, among the conventional multifunctional apparatus, there are ones in which electric power is supplied only to a unit that is required for executing a selected mode (refer to Japanese Patent Unexamined Publication No. 2008-160413 bulletin).

With an operating section of the multifunctional apparatus as described in the Japanese Patent Unexamined Publication No. 2008-160413 bulletin, an operational mode that one wants to carry out has to be selected from among all the executable plurality of modes of operation (for example, printer mode, FAX mode, scan mode, USB mode, copy mode, etc.), so that complicated manipulation is required. In addition, because it has been often the case that each model of multifunctional apparatus has its own mode name that is different model by model but for a mode of operation carrying out the same content of processing, it has not been possible for a user to select easily a mode of operation that he or she wants to carry out.

The present invention is directed to providing a processing apparatus that allows a user to make an easy selection of a mode of operation that he or she wants to carry out without requiring complicated manipulation.

SUMMARY OF THE INVENTION

A processing apparatus according to the present invention is, for example, an image forming apparatus, a stereo system, or a television and recorder, or the like; and comprises a plurality of units for carrying out a variety of processes. For example, in a case of an image forming apparatus, illustrative units thereof may be enumerated as follows: a FAX communication unit, a card reader, an interface units such as USB interface, a sensor unit, a printer unit, a post-processing unit, a scanner unit, a recording unit, an operating unit, a paper feeder unit, and a high capacity paper feeder unit, etc.

The processing apparatus stores in its memory section a plurality of modes of operation, associating thereof with a unit or units required for carrying out each mode of operation. For example, in the case of the image forming apparatus, printer mode, FAX mode, scan mode, USB mode, and copy mode, etc. are illustrative as the modes of operation.

The processing apparatus, when a unit or units are selected by a user from among the plurality of the units to switch the feed of electric power thereto, then making reference to the memory section, causes one or more modes of operation that are associated with the selected unit or units to be selectable. Then, the processing apparatus, when a mode is selected by a user from among the one or more modes of operation that are made to be selectable, making reference to the memory section, controls the feed of electric power to one or more units that are associated with the selected mode of operation.

BRIEF DESCRIPTION OF THE DRAWINGS

FIG. 4 is a drawing showing an example of a processing unit association table.

DETAILED DESCRIPTION OF THE INVENTION

Figure 1:
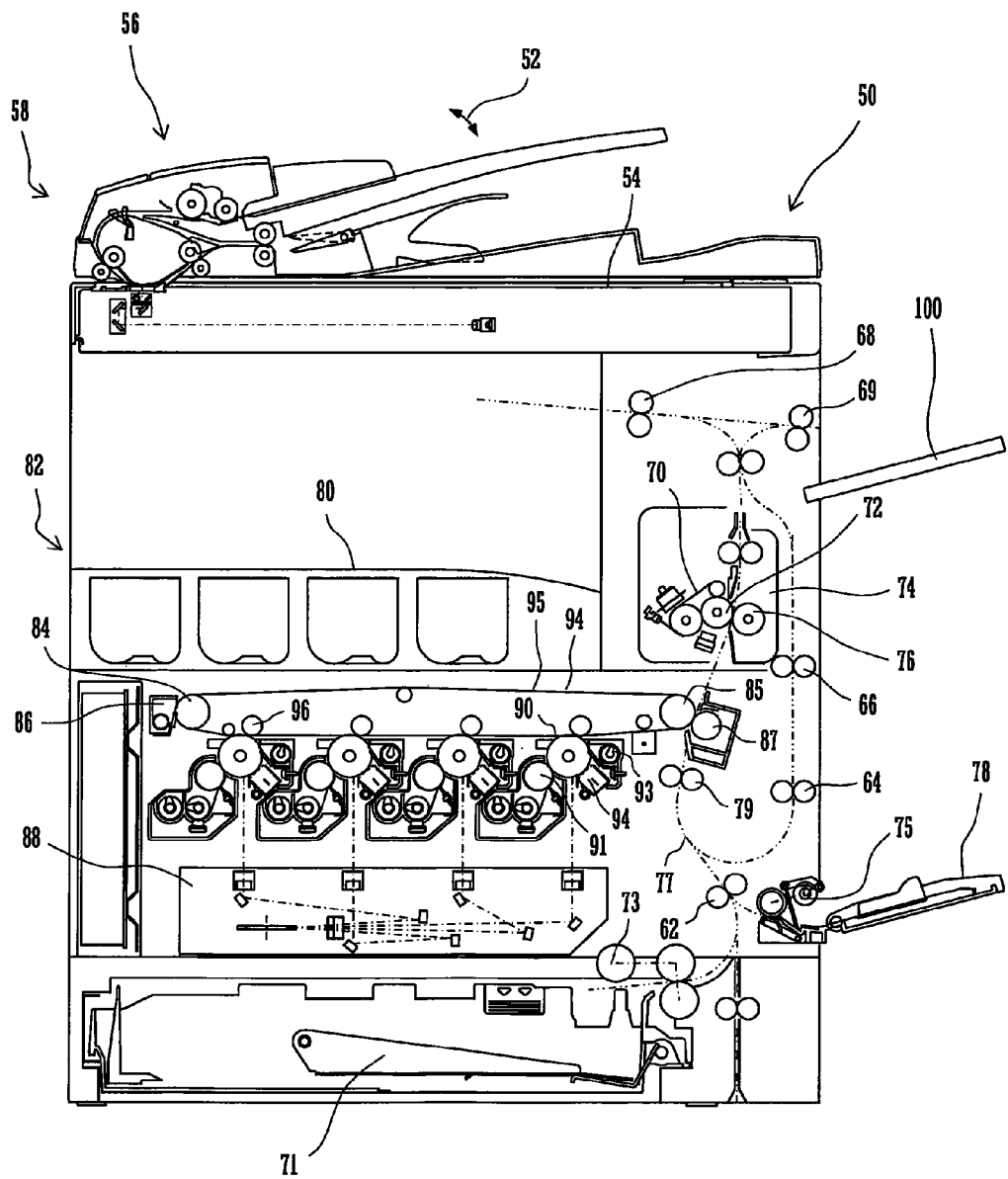
FIG. 1 is a drawing showing an outline of a multifunctional apparatus according to an embodiment of the present invention.

As shown in FIG. 1, a multifunctional apparatus 50, which forms a polychrome and/or monochromatic image onto a predetermined sheet of paper (recording paper) in response to the image data transmitted from outside, comprises an image forming section 82 and a document reading section 58.

The image forming section 82 comprises an optical scanner 88, a developing device 91, a photoreceptor drum 90, a cleaner unit 93, an electrifier 92, an intermediate transcription belt unit 95, a fuser unit 74, a paper cassette 71, a first stacking tray 80, a second stacking tray 100, a plurality of flappers to switch direction of conveying paper (illustration omitted), and so forth.

Above the image forming section 82 is provided a document table 54 made of a transparent glass on which a document is placed, and to the upper side of the document table 54 is attached an automated document processing unit 56. The automated document processing unit 56 conveys a document onto the document table 54 automatically. Besides, the automated document processing unit 56 is capable of swinging freely in the direction of the arrow 52, and thus permitting manual placement of a document when the upper part of the document table 54 is opened.

The optical scanner 88 forms an electrostatic latent image on the surface of the photoreceptor drum 90 based on the inputted image data. The developing device 91 makes electrostatic latent image formed on each photoreceptor drum 90 a manifest image with a four-colored (YMCK) toner. The electrifier 92 charges the surface of the photoreceptor drum 90 uniformly at a predetermined electrostatic potential. The cleaner unit 93 removes and collects the toner remaining on the surface of the photoreceptor drum 90 after the image developing and transcription process.

The intermediate transcription belt unit 95 disposed above the photoreceptor drum 90 comprises an intermediate transcription belt 94, an intermediate transcription belt drive roller 85, an intermediate transcription belt compliance roller 84, an intermediate transcription roller 96, and an intermediate transcription belt cleaning unit 86. The intermediate transcription belt drive roller 85, intermediate transcription belt compliance roller 84, and intermediate transcription roller 96 suspend the intermediate transcription belt 94 in a tensioned condition, and rotationally drive the intermediate transcription belt 94.

The intermediate transcription belt 94 is installed so as to come into contact with each photoreceptor drum 90, and forms color toner images by transcribing the toner images of each color formed on the photoreceptor drums 90 onto the intermediate transcription belt 94 through a sequential superimposition. Transcription of the toner image from the photoreceptor drum 90 onto the intermediate transcription belt 94 is performed by the intermediate transcription roller 96 that is in contact with the rear side of the intermediate transcription belt 94. To the intermediate transcription roller 96 is applied a high voltage transcription bias so as to transcribe the toner image.

The toner images on the respective photoconductor drums 90 are superimposed, in response to respective hues, on the intermediate transcription belt 94. In this manner, with the rotation of the intermediate transcription belt 94, the superimposed image information is transcribed onto paper by a transcription roller 87 disposed at the position where the paper comes into contact with the intermediate transcription belt 94. The intermediate transcription belt 94 and the transcription roller 87 are pressure contacted with a predetermined nip, and a voltage for transcribing the toner onto paper is applied to the transcription roller 87.

Because the toner, which adhered to the intermediate transcription belt 94 when the intermediate transcription belt 94 came into contact with the photoreceptor drum 90, or which remained on the intermediate transcription belt 94 when transcription therefrom had not been made onto paper by the transcription roller 87, causes color mixture of the toner in the next step, an intermediate transcription belt cleaning unit 86 is set up so as to remove and collect the toner.

A paper cassette 71 is a tray to store the sheets of paper (recording paper) to be used for image forming, and is installed in the lower side of the optical scanner 88 of the image forming section 82. Additionally, paper to be used for image forming can be placed onto a hand-fed paper cassette 78.

Further, the first stacking tray 80 is installed in the upper side of the imaging section 82, and accumulates sheets of paper that are finished with printing with their printed face facing downwards. On the other hand, the second stacking tray 100 is disposed outside the housing of the multifunctional apparatus 50, and accumulates sheets of paper that are finished with printing with their printed face facing upwards.

Also, in the image forming section 82, a paper conveying path 77 of generally vertical shape is provided so as to transmit paper of the paper cassette 71 and the hand-fed paper cassette 78, by way of the transcription roller 87 and the fuser unit 74, to the first stacking tray 80 or the second stacking tray 100. In the vicinity of the paper conveying path 77, which extends from the paper cassette 71 or the hand-fed paper cassette 78 to the first stacking tray 80 and the second stacking tray 100, are disposed pickup rollers 73, 75, a plurality of conveyor rollers 62, 64, 66, 68, a resisting roller 79, a transcription roller 87, a fuser unit 74, and so on.

The conveyor rollers 62, 64, 66, 68 are small rollers to facilitate and aid conveyance of paper, and a plurality of them are installed along the paper conveying path 77. Moreover, the pickup roller 73, which is installed in the vicinity of an edge of the paper cassette 71, supplies paper by picking it up piece by piece from the paper cassette 71 to the paper conveying path 77. Similarly, the pick-up roller 75, which is installed in the vicinity of an edge of the hand-fed paper cassette 78, also supplies paper by picking it up piece by piece from the hand-fed paper cassette 78 to the paper conveying path 77.

Then, the resisting roller 79 holds the paper temporarily while it is conveyed through the paper conveying path 77, and has a function to convey paper to the transcription roller 87 with a timing that adjusts the leading edge of the toner image on the photoreceptor drum 90 to the leading edge of the paper.

The fuser unit 74 comprises a heating roller 72 and a pressure roller 76, and the heating roller 72 and pressure roller 76 rotate holding the paper in between. Then the heating roller 72 is set by a control section to a predetermined fusing temperature, based on the signal from a temperature sensor which is not illustrated; and together with the pressure roller 76, performs function of heat fusing on paper by means of the thermo-compression bonding of toner onto the paper, i.e., through fusing, mixing and pressure-contacting the transcribed multicolor toner images onto the paper. Also provided is an external heating belt 70 for heating the heating roller 72 from outside.

Figure 2:
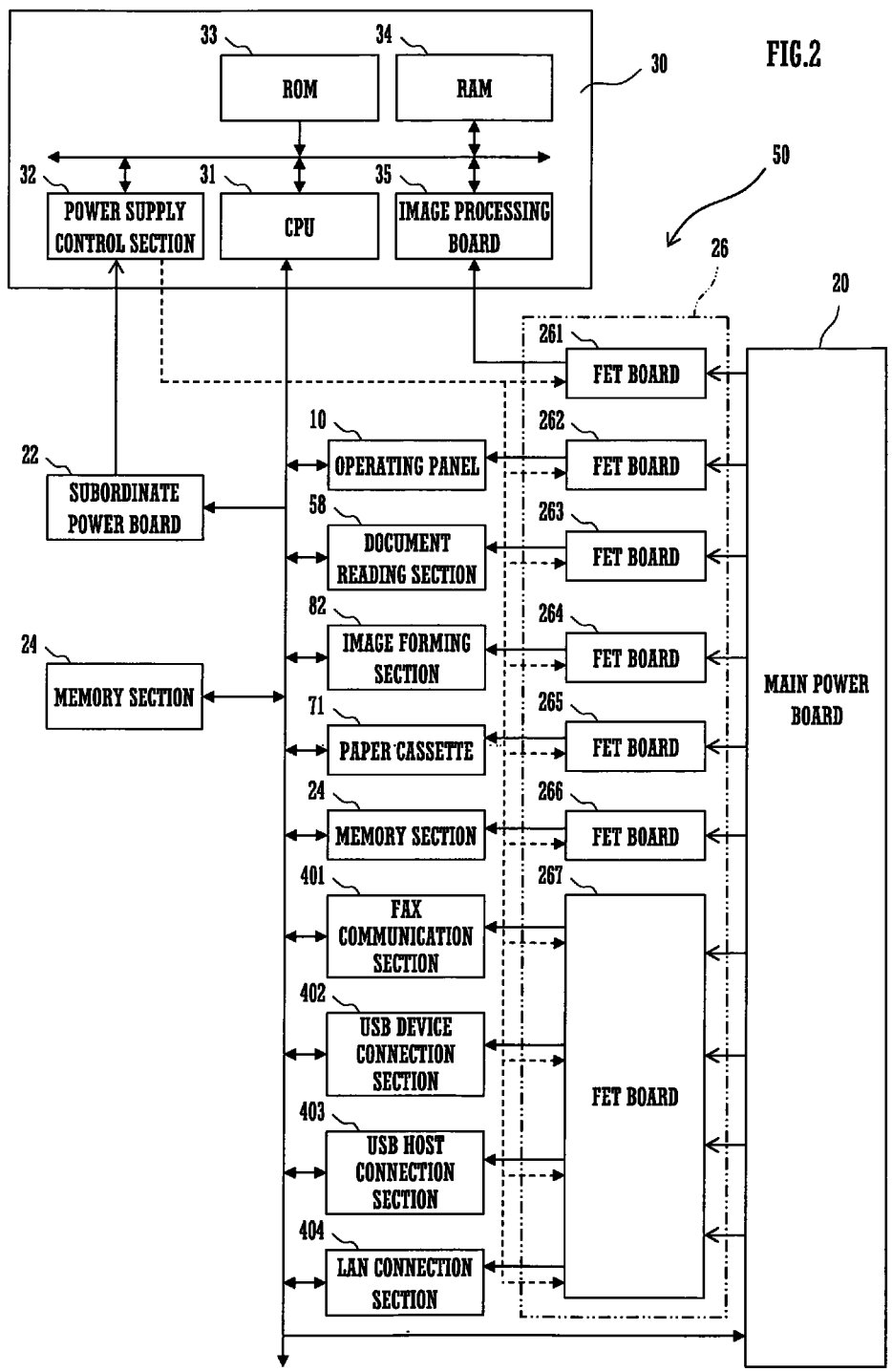
FIG. 2 is a block diagram of the multifunctional apparatus.

As shown in FIG. 2, the multifunctional apparatus 50 comprises a main power board 20 that is designated to be a source of power supply in a ready (normal operation) mode, a subordinate power board 22 that is designated to be a source of power supply in a sleep mode, and a control section 30. The ready mode is a state in which all processing unit are fed with electricity. The sleep mode is a state in which all processing units but any interface for receiving an input signal from outside are not fed with electricity. The main power board 20 and the subordinate power board correspond to a power supply section of the present invention.

The control section 30 comprises a ROM 33, a RAM 34, a power supply control section 32, an image processing board 35 and a CPU31. The ROM33 stores a plurality of programs that are required for operating the multifunctional apparatus 50, and a processing unit association table (see FIG. 4) as described below. The RAM 34, which the CPU31 is directly accessible to, is a volatile memory for storing temporarily necessary data. The power supply control section 32 operates with the electric power from the subordinate power board 22, and carries out an electric power feed control to each processing unit of the multifunctional apparatus 50. The image processing board 35 carries out an image processing based on the inputted image data following a predetermined procedure. The CPU 31 generally controls each section of the multifunctional apparatus 50 based on the programs read out from the ROM33. And the CPU 31 controls the power supply control section 32 and the image processing board 35 based on the processing unit association table read out from the ROM 33.

To the control section 30 are connected the document reading section 58, image forming section 82, paper cassette 71, memory section 24, interface section 40, memory section 24, and an operating panel 10. In this embodiment, the document reading section 58, image forming section 82, paper cassette 71, memory section 24, interface section 40, operating panel 10 and the image processing board 35 correspond to a plurality of processing units of the present invention.

The interface section 40 performs communication with external instruments. In this embodiment, the interface section is provided with a FAX communication section 401, a USB device connection section 402, a USB Host connection section 403 and a LAN connection section 404. The memory section 24 comprises a hard disk drive that is capable of storing a large quantity of image data and the like.

Figure 3:
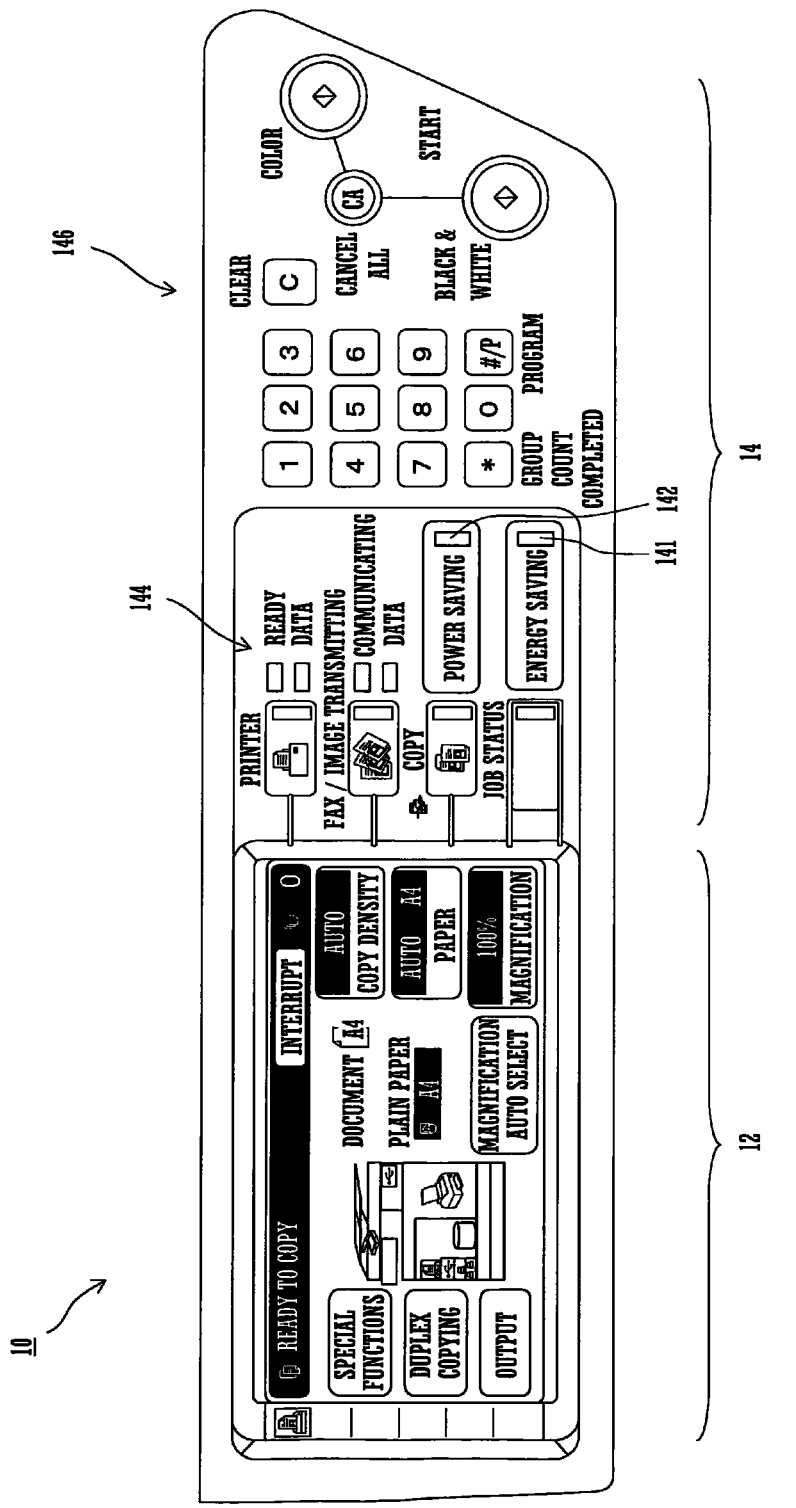
FIG. 3 is a drawing showing an exemplary configuration of an operating panel.

The operating panel 10 comprises a display section 12 and an operating section 14, as shown in FIG. 3. The display section 12 is, for example, a liquid crystal display. The display section 12 displays an icon depicting the multifunctional apparatus 50; and, based on a control signal from the control section 30, displays information indicating the electricity feed status (i.e., whether in electricity-fed-state or in electricity-not-fed state) of each processing unit additionally in the icon of the multifunctional apparatus 50. Also, in this embodiment, to the display section 12 is adopted a touch panel section that detects a touching operation made in the icon, and then outputs to the control section 30 the positional information of the operation made. A locator device in the touch panel section to detect the positional information of an icon that depicts information on a unit, corresponds to a select-unit section of the present invention. Further, although icons are employed in this embodiment as an embodiment of indication of the units in the display section 12, enumerating names of the units may be employed as another embodiment of indication.

The operating section 14 comprises a panel portion 144 provided with a plurality of key switches, including a key switch 141 for energy saving to direct a transition to the ready mode, and a key switch 142 for power saving to direct a transition to the sleep mode; and a group of operating keys 146 provided with a plurality of operating keys such as numeric keys.

The image processing board 35, document reading section 58, image forming section 82, paper cassette 71, interface section 40, memory section 24 and the operating panel 10 are connected to the main power board 20 through an electricity feed switching section 26. The electricity feed switching section 26 is provided with a plurality of FET boards 261-267 to selectively switch the source of power supplied from the main power board 20 to either the electricity-fed state or the electricity-no-fed state. With ON/OFF's of the FET boards 261-267 being switched based on the control signals from the power supply control section 32, supply of the power from the main power board 20 to the image processing board 35, document reading section 58, image forming section 82, paper cassette 71, interface section 40, memory section 24 and operating panel 10 is controlled.

Here, referring to FIG. 4, explained is which one or more processing units electricity is fed to in each mode. The processing unit association table indicates a correspondence between each mode and one or more processing units to which electricity is fed in a runtime for the mode, and is stored in the ROM 33. In the processing unit association table, one or more processing units required in carrying out a specific mode of operation is indicated by the mark ○ for each mode. Further, to the paper cassette 71, control of the feed of electricity is carried out in the same manner as to the image forming section 82. Also, although various modes of operation are registered in the processing unit association table, modes of operation are not limited to such.

In a printer mode, the image forming section 82 and the LAN connection section 404 are fed with electricity, and the image forming section 82 performs an image forming based on the data inputted from the LAN connection section 404. In an FAX transmitting mode, the document reading section 58, the FAX communication section 401 and the memory section 24 are fed with electricity; and after the memory section 24 has stored the data having been read by the document reading section 58, the FAX communication section 401 transmits the data via FAX. In a scan PC mode, the document reading section 58, the LAN connection section 404 and the memory section 24 are fed with electricity; and after the memory section 24 has stored the data having been read by the document reading section 58, the data are transmitted to a PC via the LAN connection section 404. In a scan HDD mode, the document reading section 58 and the memory section 24 are fed with electricity, and the memory section 24 stores the data having been read by the document reading section 58. In a scan USB mode, the document reading section 58, the USB device connection section 402, the USB Host connection section and the memory section 24 are fed with electricity; and after the memory section 24 has stored the data having been read by the document reading section 58, the data are outputted from the USB device connection section 402 or a USB of the USB Host connection section. In a USB print mode, the USB device connection section 402, the image forming section 82, the USB Host connection section the and memory section 24 are fed with electricity; and after the memory section 24 has stored the data having been inputted from the USB device connection section 402 or the USB Host connection section 403, the image forming section 82 performs an image forming based on the data. In a copy mode, the document reading section 58, the image forming section 82 and the memory section 24 are fed with electricity; and after the memory section 24 has stored the data having been read by the document reading section 58, the image forming section 82 performs an image forming based on the data.

Figure 5:
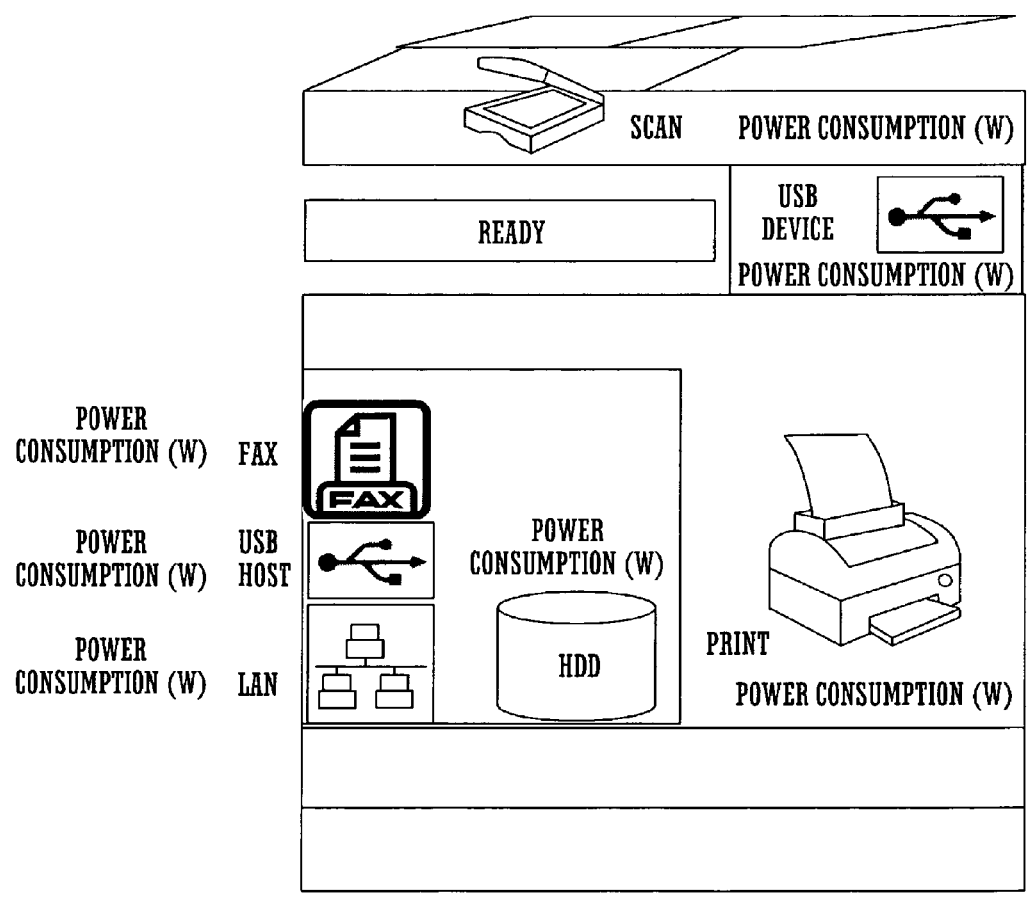
FIG. 5 is a drawing showing an example of an embodiment displaying a ready mode.
Figure 6:
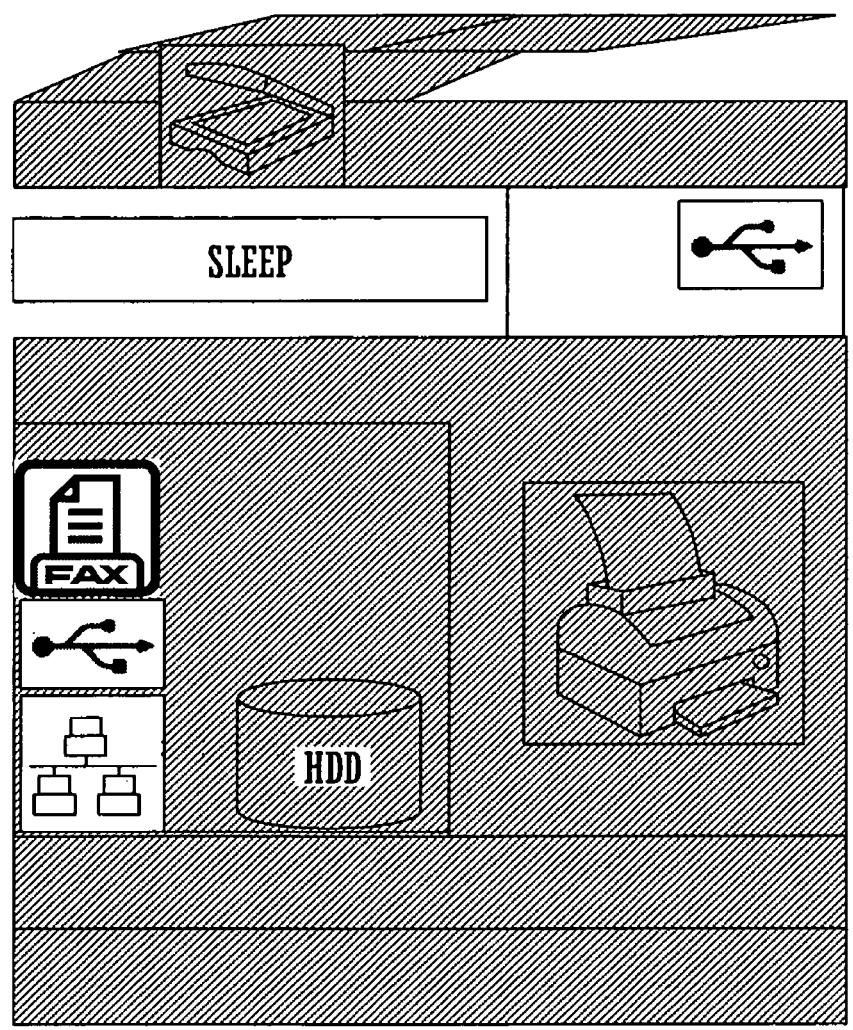
FIG. 6 is a drawing showing an example of an embodiment displaying a sleep mode.
Figure 7:
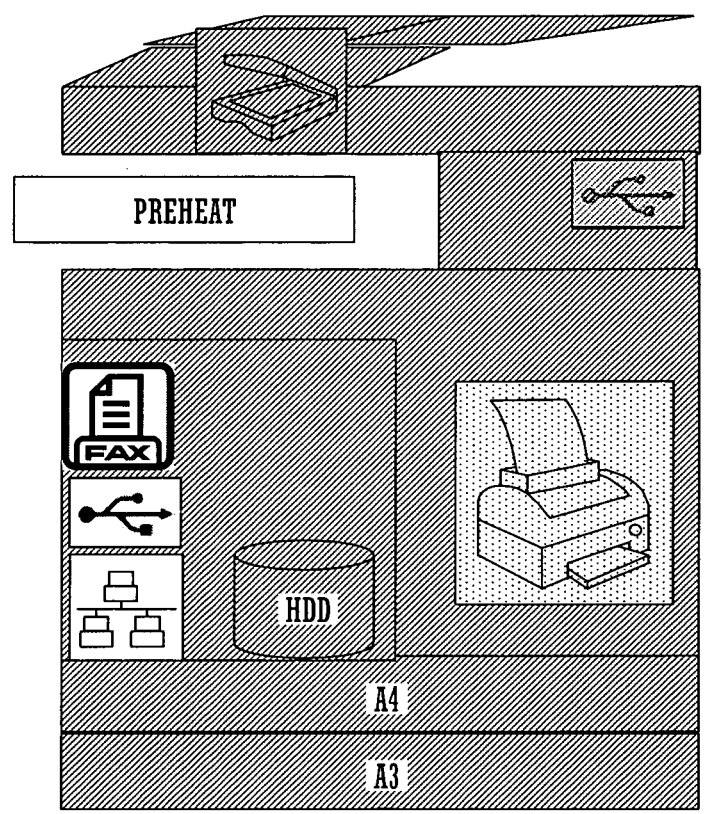
FIG. 7 is a drawing showing an example of an embodiment displaying a preheating mode.

Next, using FIG. 5-FIG. 7, display screens indicated in the display section 12 are explained. As shown in FIG. 5 and FIG. 6, there are portions in the icon of the multifunctional apparatus 50 each of which correspond to each processing unit; where, a portion is displayed brightly when its corresponding processing unit is in electricity-fed state, whereas a portion is displayed darkly when its corresponding processing unit is in electricity-not-fed state. Besides, because icons depicting each processing unit are displayed at each position corresponding to each processing unit in the icon depicting the multifunctional apparatus 50, function of each processing unit can be recognized at first sight. Additionally, as shown in FIG. 5, information indicating the electric power consumption is added to at portions corresponding to each processing unit in the icon of the multifunctional apparatus 50.

As mentioned above, with the indications in the display section 12, it is recognizable at first sight whether the multifunctional apparatus 50 is in the ready mode or in the sleep mode; thus, variations of indication in the display section 12 also includes such an embodiment in which a mode of operation is indicated.

FIG. 7 shows the icon at the time when transition was made from the sleep mode to a preheating mode. In the preheating mode, when it is selected via the touch panel section of the operating panel 10, the image forming section 82 is preheated beforehand by repeated ON/OFF switching of the feed of electricity to the image forming section 82. By preheating the image forming section 82 beforehand in this manner, it is enabled to shorten the time required for the image forming section 82 to become available for use.

Further, in the preheating mode, the display section 12 is also configured to display an icon indicating being in the preheating mode. During the preheating mode, the position corresponding to the image forming section 82 in the icon is rendered in gray; thereby it is shown that the image forming section 82 is currently under preheating. Additionally, a transition to the preheating mode is carried out when the transition from the sleep mode to the preheating mode is directed, or when a predetermined period of time has lapsed from the ready mode or various modes of operation. Then, when a predetermined period of time has passed in the preheating mode, a transition to the sleep mode is carried out. Further, after the preheating has been completed, rendition of the position corresponding to the image forming section 82 in the icon may be changed to have a display similar to that of the electricity-fed state.

Next, using FIG. 8-FIG. 14, an exemplary illustration of display screens by an electricity feed control utilizing the processing unit association table is explained. The multifunctional apparatus 50 directly switches ON/OFF of the feed of electricity to each processing unit by a touching operation to the positions corresponding to each processing unit in the icon.

Figures 8A, 8B:
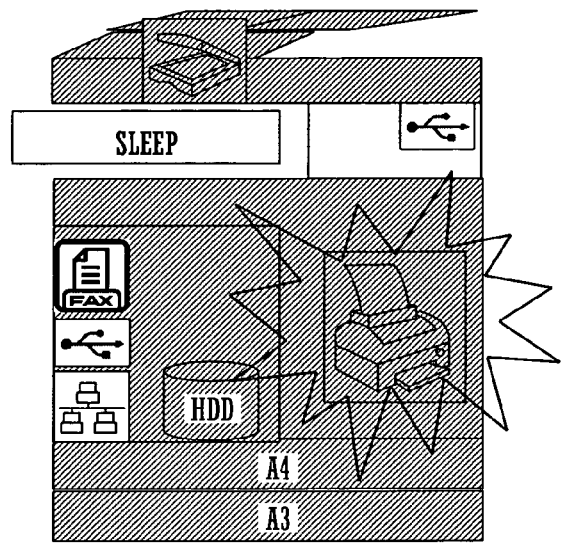
FIG. 8A is a drawing showing an icon in the sleep mode and of a state in which the feed of electricity to an image forming section is started by manual operation.
FIG. 8B is a drawing showing a selection screen displayed in a display section in the state of FIG. 8A.

For example, FIG. 8A shows the icon of a state in which the feed of electricity is started, by manual operation in the sleep mode, to the image forming section 82. By touching a position corresponding to the image forming section 82 in the icon in the sleep mode, the feed of electricity to the image forming section 82 is started. At this time, the icon of the image forming section 82, after being lightened and darkened and thus having been flashed for a predetermined period of time (for example, 15 seconds, 30 seconds or the like), is displayed brightly. By the flashing, one can recognize that the feed of electricity is started to the image forming section 82.

Additionally, when the position corresponding to the icon of the image forming section 82 is touched, a selection screen as shown in FIG. 8B is displayed to the display section 12. In the selection screen, the modes of operation (printer mode, USB print mode and copy mode) that require the feed of electricity to the image forming section 82 are indicated as selectable icons. A locator device in the touch panel section for detecting positional information of icons depicting information on the modes of operation corresponds to a select-mode-of-operation section of the present invention.

Figure 9A:
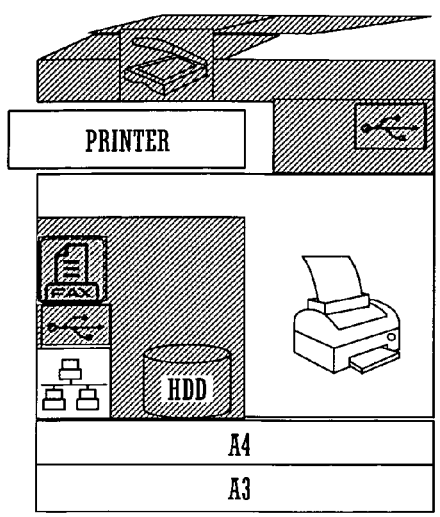
FIG. 9A is a drawing showing a state in which the icon in a printer mode is displayed.
Figure 9B:
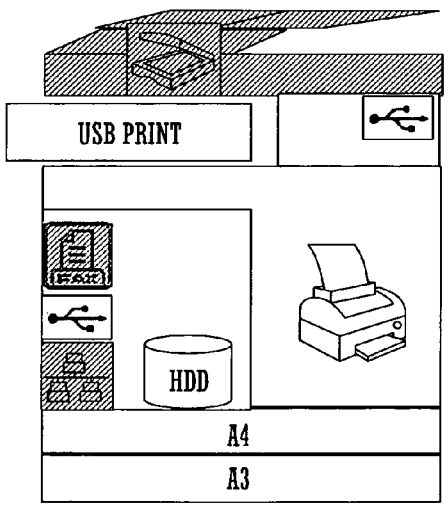
FIG. 9B is a drawing showing a state in which the icon in a USB print mode is displayed.
Figure 9C:
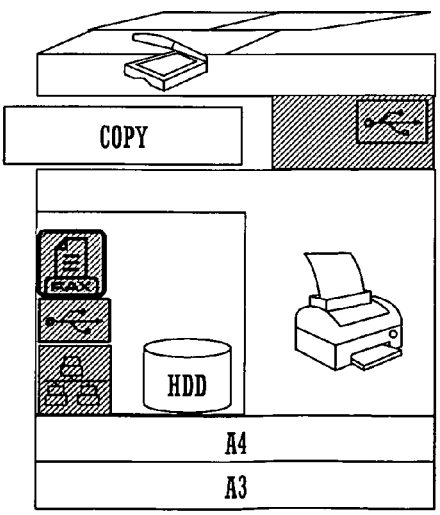
FIG. 9C is a drawing showing a state in which the icon in a copy mode is displayed.

When the printer mode is selected, the feed of electricity is started to the LAN connection section 404 that is used in carrying out the printer mode; and the icon in the printer mode as shown in FIG. 9A is displayed. When the USB print mode is selected, the feed of electricity is started to the USB device connection section 402, the USB Host connection section 403, and the memory section 24 that are used in carrying out the USB print mode; and the icon in the USB print mode as shown in FIG. 9B is displayed. When the copy mode is selected, the feed of electricity is started to the document reading section 58 and the memory section 24 that are used in carrying out the copy mode; and the icon in the copy mode as shown in FIG. 9C is displayed. In addition, in each selected mode of operation, the feed of electricity is halted to any of the processing units that does not require electricity to be fed to.

Figures 10A, 10B:
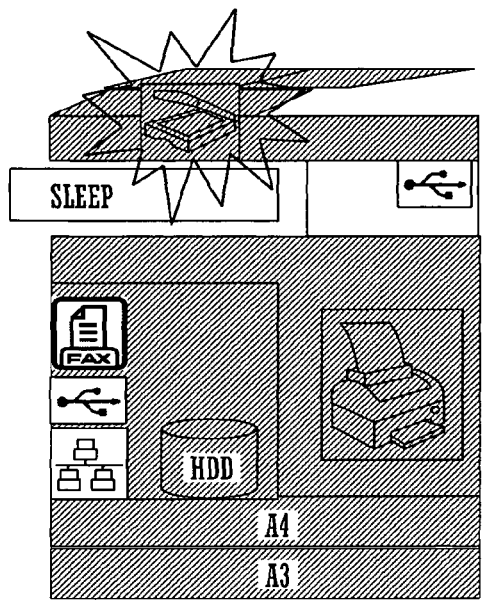
FIG. 10A is a drawing showing the icon in the sleep mode and of a state in which the feed of electricity to a document reading section is started by manual operation.
FIG. 10B is a drawing showing a selection screen displayed in the display section in the state of FIG. 10A.

Further, FIG. 10A shows the icon of a state in which the feed of electricity is started, by manual operation in the sleep mode, to the document reading section 58. By touching a position corresponding to the document reading section 58 in the icon in the sleep mode, the feed of electricity to the document reading section 58 is started. At this time, the icon of the document reading section 58, after being lightened and darkened and thus having been flashed for a predetermined period of time, is displayed brightly. By the flashing, one can recognize that the feed of electricity is started to the document reading section 58.

Additionally, when the position corresponding to the icon of the document reading section 58 is touched, a selection screen as shown in FIG. 10B is displayed to the display section 12. In the selection screen, the modes of operation that require the feed of electricity to the document reading section 58 are indicated as selectable icons. When any of the modes of operation is selected, the feed of electricity is started to any of the processing units that is used in carrying out the selected mode of operation; and the icon in the mode of operation is displayed. In addition, in each selected mode of operation, the feed of electricity is halted to any of the processing units that does not require electricity to be fed to.

Figures 11A, 11B:
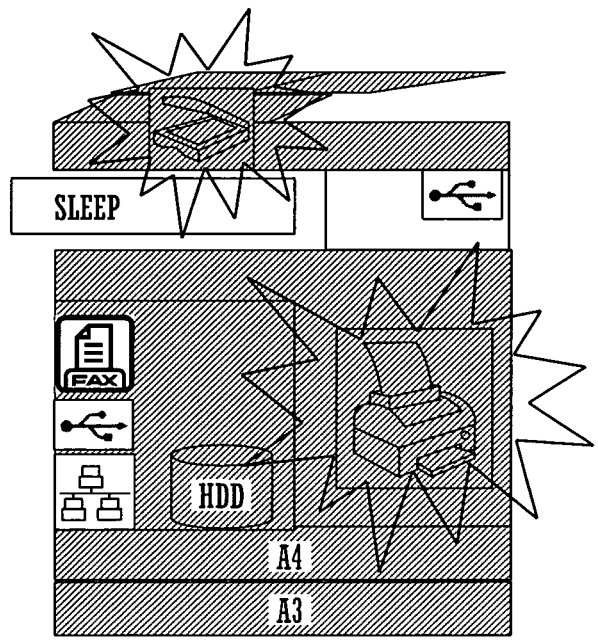
FIG. 11A is a drawing showing the icon in the sleep mode and of a state in which the feed of electricity to the document reading section and the image forming section is started by manual operation.
FIG. 11B is a drawing showing a selection screen displayed in the display section in the state of FIG. 11A.

Further, FIG. 11A shows the icon of a state in which the feed of electricity is started, by manual operation in the sleep mode, to the document reading section 58 and the image forming section 82. By touching positions respectively corresponding to the document reading section 58 and the image forming section 82 in the icon in the sleep mode, the feed of electricity to the document reading section 58 and the image forming section 82 is started. At this time, the icons of the document reading section 58 and the image forming section 82, after being lightened and darkened and thus having been flashed for a predetermined period of time, are displayed brightly. By the flashing, one can recognize that the feed of electricity is started to the document reading section 58 and the image forming section 82.

Additionally, when the positions respectively corresponding to the icon of the document reading section 58 and the icon of the image forming section 82 are touched, a selection screen as shown in FIG. 11B is displayed to the display section 12. In the selection screen, the copy mode that requires the feed of electricity to the document reading section 58 and the image forming section 82 is indicated as the selectable icon.

As described above, the multifunctional apparatus 50, by prompting a user first to select one or more processing units to use, and subsequently to select a mode of operation to carry out from among the modes of operation in which the one or more processing units are used, can yield a reduced number of alternatives (selectable modes of operation). Consequently, a user, without making complicated operations, can easily select a mode of operation to carry out.

Figure 12A:
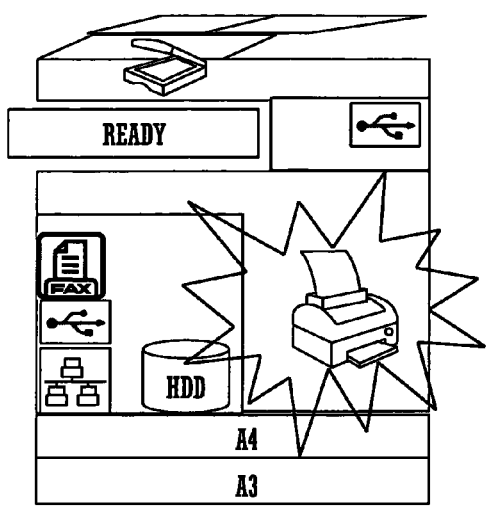
FIG. 12A is a drawing showing the icon in the ready mode and of a state in which the feed of electricity to the document reading section is halted by manual operation.

Further, FIG. 12A shows the icon of a state in which the feed of electricity is halted, by manual operation in the ready mode, to the image forming section 82. By touching a position corresponding to the image forming section 82 in the icon in the ready mode, the feed of electricity to the image forming section 82 is halted. At this time, the icon of the image forming section 82, after being lightened and darkened and thus having been flashed for a predetermined period of time, is displayed darkly. By the flashing, one can recognize that the feed of electricity is halted to the image forming section 82.

Figure 12B:
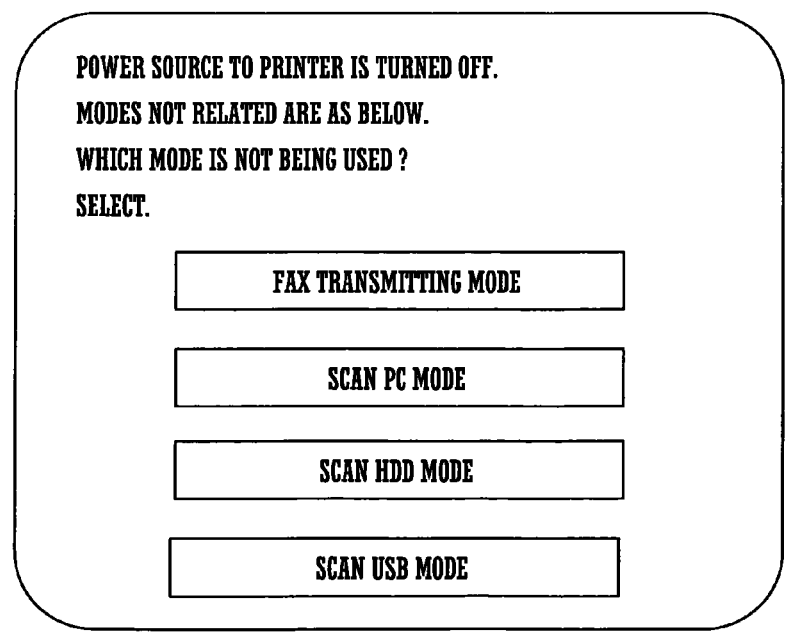
FIG. 12B is a drawing showing a selection screen displayed in the display section in the state of FIG. 12A.

Additionally, when the position corresponding to the icon of the image forming section 82 is touched, a selection screen as shown in FIG. 12B is displayed to the display section 12. In the selection screen, the modes of operation (FAX transmitting mode, scan PC mode, scan HDD mode and scan USB mode) that do not require the feed of electricity to the image forming section 82 are indicated as selectable icons.

Figure 13A:
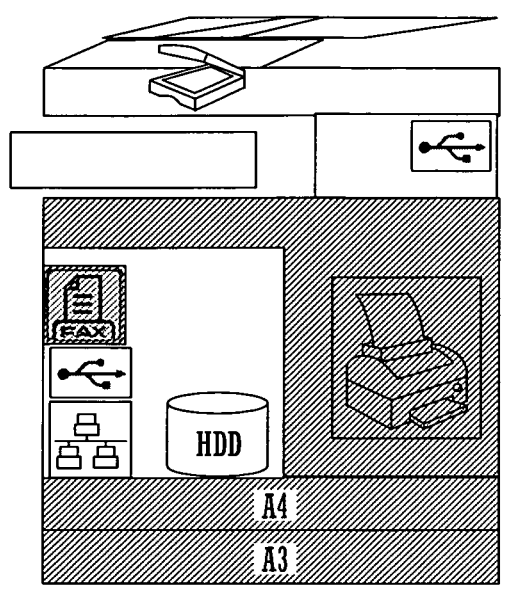
FIG. 13A is a drawing showing the icon when a FAX transmitting mode is selected in the selection screen of FIG. 12B.
Figure 13B:
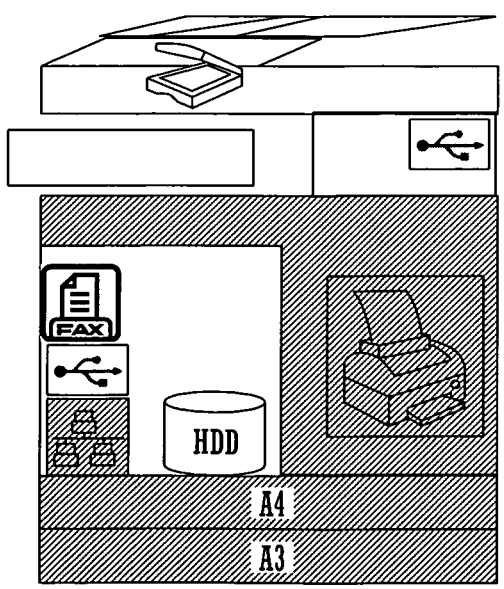
FIG. 13B is a drawing showing the icon when a scan PC mode is selected in the selection screen of FIG. 12B.
Figure 14A:
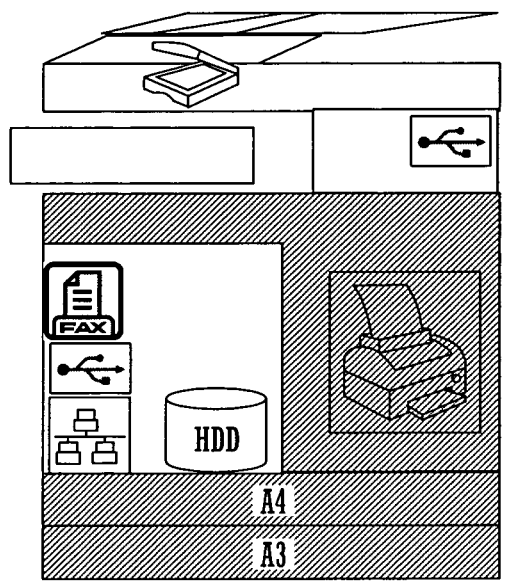
FIG. 14A is a drawing showing the icon when a scan HDD mode is selected in the selection screen of FIG. 12B.
Figure 14B:
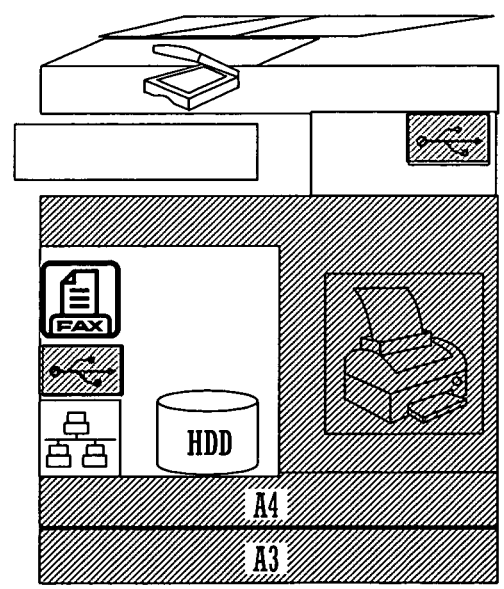
FIG. 14B is a drawing showing the icon when a scan USB mode is selected in the selection screen of FIG. 12B.

When the FAX transmitting mode is selected, the feed of electricity is halted to the FAX communication section 401 that is used only for carrying out the FAX transmitting mode; and the icon as shown in FIG. 13A is displayed. When the scan PC mode is selected, the feed of electricity is halted to the LAN connection section 404 that is used only for carrying out the scan PC mode; and the icon as shown in FIG. 13B is displayed. When the scan HDD mode is selected, since there is not any processing unit that is used only for carrying out the scan HDD mode, the icon as shown in FIG. 14A is displayed. When the scan USB mode is selected, the feed of electricity is halted to the USB device connection section 402 and the USB Host connection section 403 that are used only for carrying out the scan USB mode; and the icon as shown in FIG. 14B is displayed.

As described above, the multifunctional apparatus 50, by prompting a user first to select one or more processing units not to use, and subsequently further to select one or more modes of operation not to carry out from among the modes of operation in which the processing units other than the one or more selected processing units are used, can yield a reduced number of alternatives (selectable modes of operation). Consequently, a user, without making complicated operations, can halt the feed of electricity to the one or more processing units not to use without exception.

Figure 15:
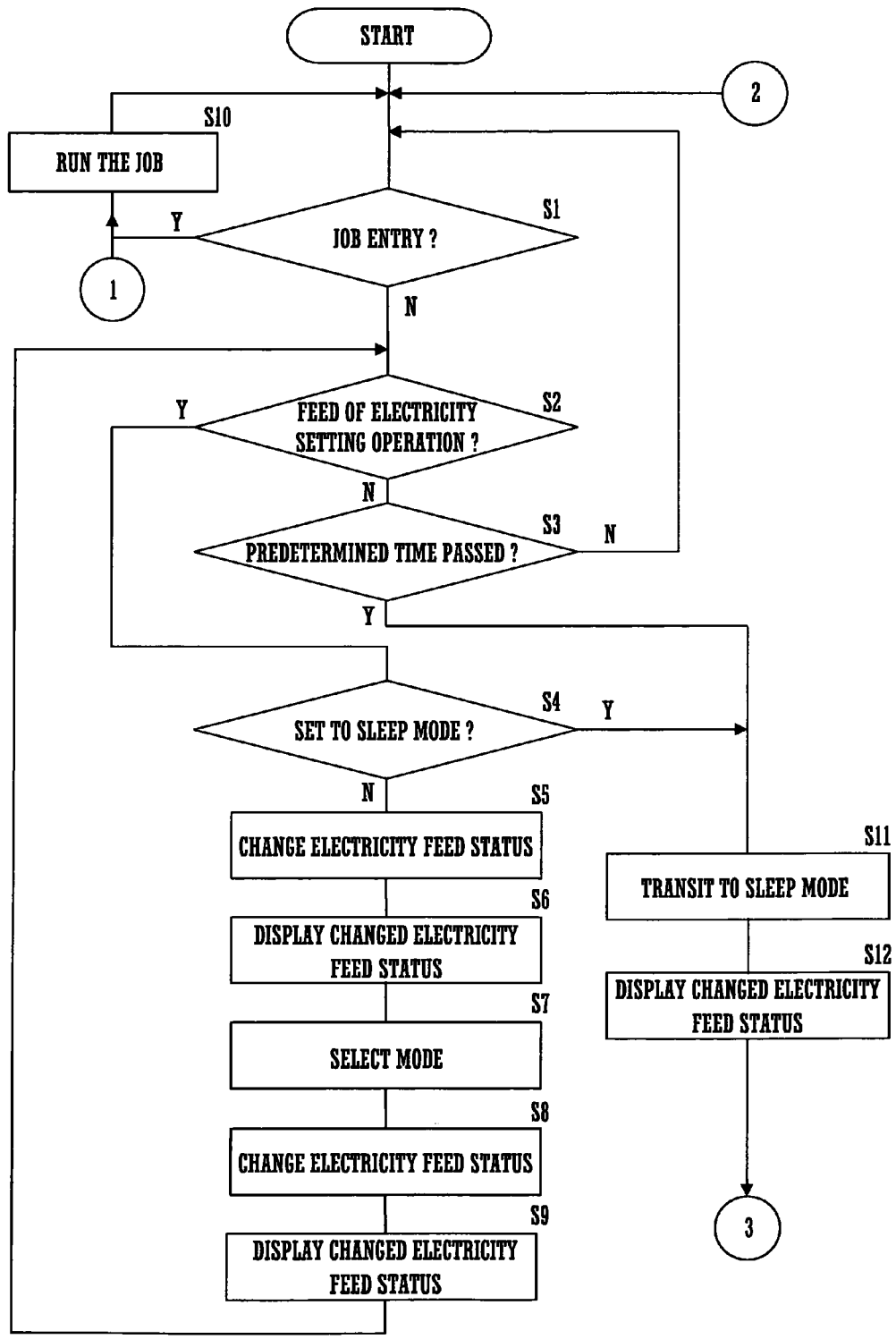
FIG. 15 is a flow chart showing exemplary procedures for an electricity feed control in the multifunctional apparatus.
Figure 16:
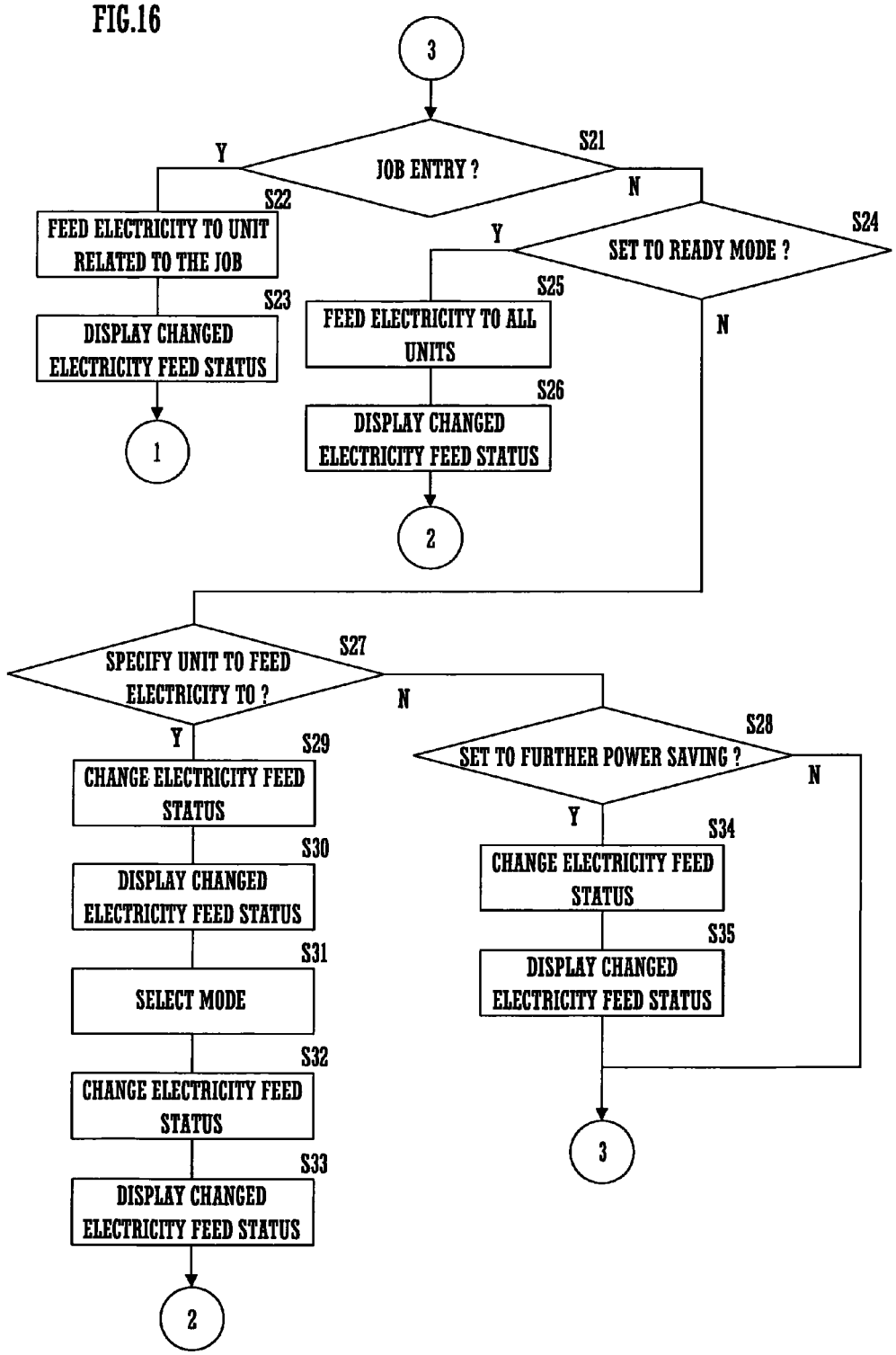
FIG. 16 is a flow chart showing exemplary procedures for the electricity feed control in the multifunctional apparatus.

Subsequently, using FIG. 15 and FIG. 16, procedures for an electricity feed control to each processing unit are explained. In a state (the ready mode) where the main power supply of the multifunctional apparatus 50 is turned on and booted up, the control section 30 monitors whether job entry is made or not (S1). When job entry is made at the monitoring step of S1, the control section 30 carries out a job based on an inputted command (S10).

On the other hand, when job entry is not made, the control section 30 determines whether or not the feed of electricity setting operation has been made to the operating panel 10 (S2). When the feed of electricity setting operation is not made at the decision step of S2, it determines whether or not a stand-by time has become not less than a predetermined time (S3). When the stand-by time has become not less than the predetermined time, the control section 30 makes a transition to a sleep mode (S11). In contrast, when the feed of electricity setting operation is made at the decision step of S2, the control section 30 determines whether or not the feed of electricity setting operation is the one to direct a transition to the sleep mode (S4).

At the decision step of S4, when the feed of electricity setting operation is the one to direct a transition to the sleep mode, (i.e., operation of the key switch 142 for power saving or the like), the control section 30 makes a transition to the sleep mode (S11). On the other hand, when the feed of electricity setting operation is made not to direct a transition to the sleep mode but to specify one or more processing units to which the feed of electricity is to be halted (for example, when the icon of the image forming section 82 is touched), the control section 30 halts the feed of electricity to the one or more processing units (the image forming section 82) to which the feed of electricity is to be halted based on the operation details (S5). Then, the control section 30 causes to flash the one or more icons of the processing units (image forming section 82), and to display, in the display section 12, the icon indicating an electricity feed status (refer to FIG. 12A) after the change was made (S6). Moreover, the control section 30, referring to the processing unit association table (refer to FIG. 4), cause to display in the display section 12 all modes of operation (refer to FIG. 8B) that are not related to any processing unit (the image forming section 82) of which electricity feed status was changed; and prompts a user to select a mode of operation (S7). The control section 30, referring to the processing unit association table, halts the feed of electricity to one or more processing units (the FAX communications section 401) that are used only in the mode of operation (for instance, the FAX transmitting mode) that a user has selected (S8); and causes to display in the display section 12 the icon (refer to FIG. 13A) indicating an electricity feed status after the change was made (S9).

At the transition to the sleep mode step of S11, the control section 30, by controlling the electricity feed switching section 26 through the power supply control section 32, halts the feed of electricity to each processing unit; and the icon (refer to FIG. 6) indicating the sleep mode is displayed in the display section 12 (S12).

After the multifunctional apparatus 50 made a transition to the sleep mode, the control section 30 always monitors whether or not there is job entry that triggers a reset (S21). At the monitoring step of S21, when job entry is made, the control section 30 starts the feed of electricity to the one or more processing units that are related to carrying out the inputted job (S22), and displays in the display section 12 the icon reflecting the change of the electricity feed status (S23). Subsequently, the job is carried out (S10), then a transition is made to the decision step of S1; and a process similar to the abovementioned is carried out. On the other hand, at the monitoring step of S21, when job entry is not made, the control section 30 monitors whether or not a transition to the ready mode has been directed (whether or not cancellation operation of the sleep mode has been made) (S24).

At the monitoring step of S24, when a transition to the ready mode is directed by an operation of the key switch 141 for energy saving or the like, the control section 30 starts the feed of electricity to all the processing units (S25), and displays in the display section 12 the icon (refer to FIG. 5) reflecting the change of the electricity feed status (S26). Further, after that, a transition is made to the decision step of S1; and a process similar to the abovementioned is carried out. In contrast, at the monitoring step of S24, when a transition to the ready mode is not directed, the control section 30 monitors whether or not an operation is made to specify one or more processing unit to which electricity is to be fed as shown in FIG. 8-FIG. 14 (S27).

At the monitoring step of S27, when the operation is made to specify one or more processing units to which electricity is to be fed (for example, when the icon of the image forming section 82 is touched), the control section 30 starts the feed of electricity to the one or more processing units (the image forming section 82) to which electricity is to be fed based on the operation details (S29). Then, the control section 30 causes to flash one or more icons of the one or more processing units (the image forming section 82), and to display in the display section 12 the icon (refer to FIG. 8A) indicating an electricity feed status after the change was made (S30). Moreover, the control section 30, referring to the processing unit association table (refer to FIG. 4), causes to display in the display section 12 all modes of operation (refer to FIG. 8B) that are related to any processing unit (the image forming section 82) of which electricity feed status was changed; and prompts a user to select a mode of operation (S31). The control section 30, referring to the processing unit association table, starts the feed of electricity only to one or more processing units (the LAN connection section 404) that are used in the mode of operation (for instance, the printer mode) that a user has selected (S32); and causes to display in the display section 12 the icon (refer to FIG. 9A) indicating an electricity feed status after the change was made (S33). Further, after that, a transition is made to the decision step of S1, and a process similar to the abovementioned is carried out.

At the monitoring step of S27, when the operation is not made to specify one or more processing units to which electricity is to be fed, the control section 30 monitors whether or not an operation is made to specify further power saving (S28). For example, in this embodiment, at the monitoring step of S28, it monitors whether or not direction is made to turn off all the interfaces, or to turn off all the functions but the FAX receiving function.

At the monitoring step of S28, when the operation is made to specify further power saving, the control section 30 alters the electricity feed status based on the direction (S34); and displays in the display section 12 (S35) the icon indicating the electricity feed status after the alteration was made, then makes a transition back to the monitoring step of S21 again. Further, at the monitoring step of S28, when the operation to specify further power saving is not made, a transition is made to the monitoring step of S21; and a process similar to the abovementioned is carried out.

According to the above-mentioned embodiment, the multifunctional apparatus, by prompting a user first to select one or more processing units of which electricity feed status is to be altered, and subsequently to select a mode of operation in which the one or more processing units are used, can yield a reduced number of alternatives (selectable modes of operation). Accordingly, a user, without making complicated operations, can easily select a mode of operation to carry out. Moreover, the multifunctional apparatus, by providing an indication of the electricity feed status to each processing unit, can yield an improved usability and visibility in the control of feed of electricity to each processing unit.

Figure 17A:
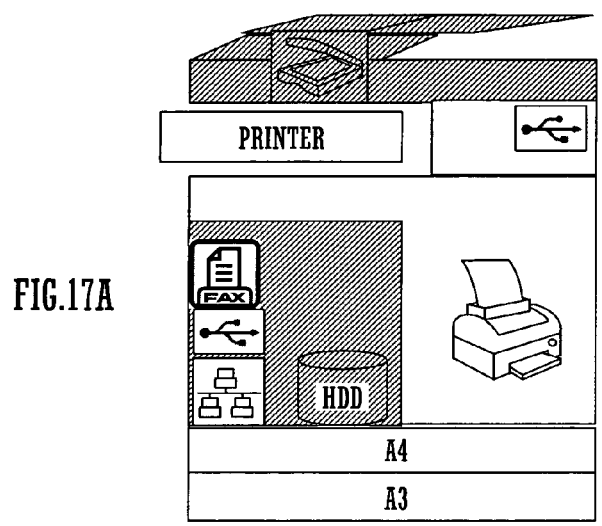
FIG. 17A is a drawing showing a state in which an icon in the printer mode is displayed in a processing apparatus according to another embodiment.
Figure 17B:
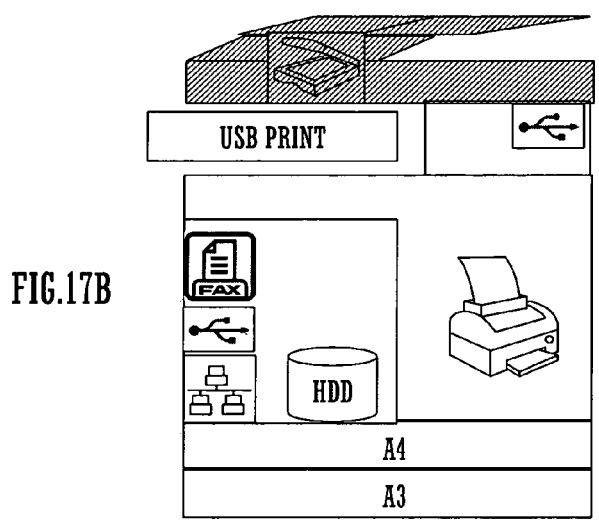
FIG. 17B is a drawing showing a state in which the icon in the USB print mode is displayed in the processing apparatus according to the other embodiment.
Figure 17C:
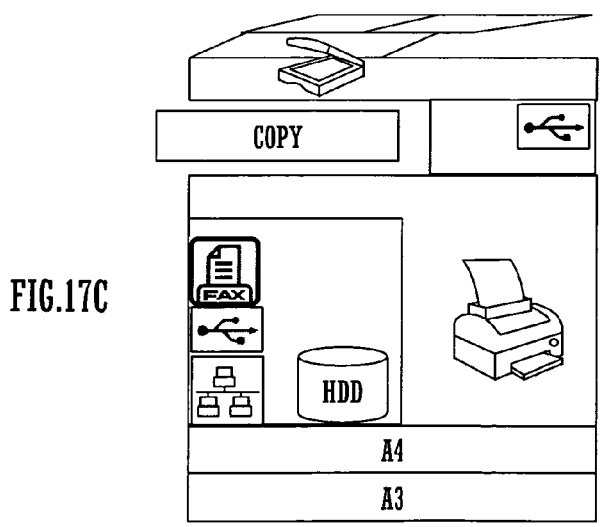
FIG. 17C is a drawing showing a state in which the icon in the copy mode is displayed in the processing apparatus according to the other embodiment.

Further, in the above described embodiment, electricity is fed only to the one or more processing units that require the feed of electricity in carrying out the mode of operation that are selected. However, electricity may be fed to any processing unit that is in the sleep mode (processing unit that receives input signal from outside), along with the one or more processing units that require the feed of electricity in carrying out the mode of operation that is selected. For example, when the printer mode is selected, the icon, instead of being displayed as shown in FIG. 9A, may be displayed as shown in FIG. 17A. Additionally, when the USB print mode or the copy mode is selected, the icon, instead of being displayed as shown in FIG. 9B or FIG. 9C respectively, may be displayed as shown in FIG. 17B or FIG. 17C respectively.

Also, in the above described embodiment, when one or more processing units are specified to alter their electricity feed status, it is allowed to alter the electricity feed status to the one or more processing units, and to select a mode of operation corresponding to the one or more processing units. Then, the alteration is made of the electricity feed status to the one or more processing unit that are associated with the selected mode of operation. However, the abovementioned procedure may be otherwise in such a manner that when a processing unit is specified to alter its electricity feed status, it is allowed to select a mode of operation associated with the processing unit; and that after a mode of operation is selected, alteration is made of the electricity feed status to the processing unit, and of the electricity feed status to one or more processing units that are associated with the selected mode of operation.

Further still, in the above described embodiment, the electricity feed status is altered by detecting a touch of the position corresponding to the icon of each processing unit; however, with a unit name and a corresponding button for each processing unit, the electricity feed status may be altered by a click of each button. Moreover, in the above described embodiment, a mode of operation is selected by detecting a touch of the position of the icon of the mode of operation associated with the processing unit of which electricity feed status was altered; however, with a mode name and a corresponding button for each mode of operation, mode of operation may be altered by a click of each button.

Also, in the above described embodiment, an image forming apparatus was chosen and explained as an example; however, it may otherwise be any processing apparatus comprising a plurality of processing units such as, for example, a stereo system comprising an AM/FM tuner section, a playback section (playback section of MD and/or CD), an interface section (USB connection section) and so on, or a TV and a recorder comprising a tuner section (broadcast reception section), a playback section, a video recording section, an interface section (LAN connection section) and the like.

The above explanation of the embodiments is nothing more than illustrative in any respect, nor should be thought of as restrictive. Scope of the present invention is indicated by claims rather than the above embodiments. Further, it is intended that any modifications thereof that are equivalent to a claim in the sense and realm of the doctrine of equivalence be included within the scope of the present invention.

What is claimed is:

1. A processing apparatus comprising:
a plurality of units capable of carrying out a variety of processes;
a power supply section for supplying the electric power to said plurality of units;
an electricity feed switching section for switching the power feeding state of the power supplied from said power supply section to each unit;
a memory section storing a plurality of kinds of operation modes by each of which a predetermined unit or units are operated among said plurality of units, so that said plurality of modes of operation are associated respectively with one or more units required to carry out each mode of operation;

a display section capable of displaying a representation of each of the plurality of units in either a first manner-if the unit corresponding to the representation is in an electricity-fed state or in a second manner if the unit corresponding to the representation is in an electricity-not-fed state;

a select-unit section for selecting a unit- among said plurality of units via units displayed by said display section, and for switching the power feeding state of the selected unit in response to the selection thereof;

a control section that, referring to said memory section, causes said display section to display one or more of said modes of operation, the one or more- displayed modes of operation being associated with the unit selected via said select-unit section; and a select-mode-of-operation section for selecting any one of said modes of operation among said one or more modes of operation which said control section causes said display section to display, wherein said control section controls, through said electricity feed switching section, the power feeding state of the power supplied to said plurality of units according to said mode of operation selected via said select-mode-of-operation section.

2. The processing apparatus as claimed in claim 1, wherein said control section, when the unit selected via said select-unit section is in electricity-not-fed state, causes said display section to display one or more modes of operation associated with the unit, referring to said memory section.

3. The processing apparatus as claimed in claim 1, wherein said control section, when the unit selected via said select-unit section is in electricity-fed state, causes said display section to display one or more modes of operation not associated with the unit, referring to said memory section.

4. The processing apparatus as claimed in claim 1, wherein said control section causes said display section to display the unit selected via said select-unit section, in a manner as to indicate switching of the power feeding state of the power supplied to the unit.

5. The processing apparatus as claimed in claim 1, wherein said control section causes said display section to display information on the electric power consumption of said plurality of units.

6. The processing apparatus as claimed in claim 1, wherein said control section controls, through said electricity feed switching section, each of said plurality of units so as to be in any one state of the electricity feed status, among the electricity-fed state in which electricity is fed thereto, the electricity -not-fed state in which electricity is not fed thereto, and the preheating state in which preheating is underway.

7. The processing apparatus as claimed in claim 1, wherein said processing apparatus is an image forming apparatus including an image forming section to form an image on a recording medium.

* * * * *